(12) United States Patent
Hui et al.

(10) Patent No.: US 6,198,749 B1
(45) Date of Patent: Mar. 6, 2001

(54) SYSTEM FOR INVERSE MULTIPLEXING ANALOG CHANNELS

(75) Inventors: Man Him Hui, Kanata; Robert Aston; Lise Vanterpool, both of Nepean, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/826,496

(22) Filed: Apr. 3, 1997

(51) Int. Cl.[7] .............. H04J 3/02; H04M 11/00; H04Q 11/00
(52) U.S. Cl. ............ 370/463; 370/524; 370/536; 375/222; 379/93.07; 379/93.08
(58) Field of Search .................. 370/468, 536, 370/264, 265, 401, 463, 465, 466, 467, 522, 524, 535, 542; 375/219, 220, 222; 379/93.01, 93.05, 93.06, 93.07, 93.08, 93.15

(56) References Cited

U.S. PATENT DOCUMENTS

| 4,864,567 | | 9/1989 | Giorgio ............................. 370/477 |
|---|---|---|---|
| 5,339,355 | | 8/1994 | Mori et al. ........................ 379/94 |
| 5,345,437 | | 9/1994 | Ogawa ............................. 370/13 |
| 5,390,239 | * | 2/1995 | Morris et al. ................... 379/93.08 |
| 5,394,392 | | 2/1995 | Scott ............................... 370/24 |
| 5,491,695 | * | 2/1996 | Meagher et al. ............... 370/468 |
| 5,608,733 | * | 3/1997 | Vallee et al. ................... 370/394 |
| 5,708,663 | * | 1/1998 | Wright et al. .................. 370/524 |
| 5,751,338 | * | 5/1998 | Ludwig, Jr. ..................... 348/17 |
| 5,757,804 | * | 5/1998 | Mcgee ............................ 370/510 |
| 5,771,229 | * | 6/1998 | Gavrilovich .................... 370/342 |
| 5,815,505 | * | 9/1998 | Mills ............................... 370/463 |
| 5,875,192 | * | 2/1999 | Cam et al. ....................... 370/474 |

FOREIGN PATENT DOCUMENTS

| 9302514 | 2/1993 | (WO) . |
|---|---|---|
| 9307727 | 4/1993 | (WO) . |
| 9732415 | 9/1997 | (WO) . |

OTHER PUBLICATIONS

J. Carl, "Analysts Critical of 56K Modems", Web Week, vol. 2, Issue 20, Dec. 16, 1996; pp. 1 and 2.

"56 Kbps Communications Across the PSTN", White Paper; K56 Technology; pp. 1 to 6; Jan. 07, 1997.

J. Duncanson, "Digital Dial–Up Bandwidth on Demand and Inverse Multiplexing", Technical Library, Technical Resources.

J. Duncanson, "The Technology of Inverse Multiplexing", Technical Library.

* cited by examiner

Primary Examiner—Alpus H. Hsu (57) ABSTRACT

A bi-directional data communication system using inverse multiplexers for transmitting and receiving data at high-speeds using regular analog channels. The inverse multiplexer splits a high-speed digital signal into low-speed digital signals that are input to analog modems. The analog modems modulate the low-speed digital signals into low-speed analog signals for transmission over the analog channels to the public switched telephone network. At the remote end, the data carried by the analog channels is reverse inverse multiplexed into a high-speed digital signal by an inverse multiplexer operating in a reverse inverse multiplexing mode.

22 Claims, 9 Drawing Sheets

SYSTEM FOR INVERSE MULTIPLEXING ANALOG CHANNELS

FIELD OF THE INVENTION

This invention relates to data communication systems, and more particularly to a system for transmitting and receiving data at high-speeds using regular analog channel connections to the public switched telephone network.

BACKGROUND OF THE INVENTION

As the demand for computer-based voice, video and data services increases, so does the demand for higher bandwidth. Networked technologies such as Integrated Services Digital Networks (ISDN), frame relay, Switched Multi-megabit Digital Service (SMDS), Asynchronous Transfer Mode (ATM), satellite data communications systems, wireless communications systems and others have all been developed to meet this demand for bandwidth. To make these services universally available requires either a new communications network infrastructure, or significant modifications to the existing one. None of these systems offers users the ability to transmit and receive data at high speeds and low cost by using regular analog channel connections to the public switched telephone network.

A common low cost alternative for transmitting data is the conventional modem, which is designed to modulate and demodulate signals between a user's digital devices, and analog channels connected to the public switched telephone network. Conventional modems offer users the ability to send and receive data at speeds of up to 33.6 kbit/s, while a newer generation of modems offer users the ability to receive data at speeds of up to 56 kbit/s. Due to limitations inherent in ordinary analog channels, this is the maximum achievable data rate for a conventional analog modem.

An option that is open to a user who desires higher data rates includes making use of switched digital services offered by interexchange carriers and local exchange carriers. These services make it possible for a user to dial up point-to-point digital connections whose bandwidth ranges from 56 kbit/s to 3 Mbit/s and beyond. Examples of these switched digital services include Switched 56, Switched 64, Switched 384, Switched 1536, and ISDN Multirate. However, the use of these switched digital services requires specialized digital access lines to the user's premises. The use of these digital access lines is commonly sold at a premium over the cost of a regular analog telephone line connected to a user's premises.

Another option open to a user who desires higher data rates is to make use of inverse multiplexing over digital data channels. Inverse multiplexing is a mechanism for aggregating multiple independent data channels across a network to create a single higher rate data channel. The equipment that performs inverse multiplexing is called an inverse multiplexer. A user desiring a higher data rate would use an inverse multiplexer to aggregate multiple calls that have been set up using the switched digital services described above. For example, if six different independent 56 kbit/s data channels are established between points A and B in a network, an inverse multiplexer can be used to combine these channels to create a single 336 kbit/s (ie. 6×56=336) data stream. Likewise, 64, 384 and 1536 kbit/s channels can be inverse multiplexed together. Inverse multiplexers are sold by equipment vendors such as Ascend Communications, Inc, Nortel™, and U.S. Robotics™.

The most common example of inverse multiplexing that is made available to users is the ISDN Basic Rate Interface (BRI). An ISDN BRI specifies an ISDN line that has two 64 kbit/s data and voice (B) channels, and one 16 kbit/s signalling (D) channel. The two B channels are inverse multiplexed together to provide the user with a single high-speed 128 kbit/s channel. However, as was the case with switched digital services, specialized digital access lines to the user's premises are required to take advantage of the capabilities of inverse multiplexing. In addition to the extra costs levied by telephone companies to use digital access lines, a further disadvantage is that these digital access lines are not available in every area where local phone service is provided.

SUMMARY OF THE INVENTION

It is a general object of the present invention to provide a data communication system that combines the high-speed capabilities of inverse multiplexing with the low cost benefits of conventional analog modems. This object is achieved by a bi-directional data communication device comprising an inverse multiplexer having a high-speed side and a low-speed side, a plurality of analog modems each having a first terminal connected in common to the low-speed side of the inverse multiplexer and each having a second terminal whereby a high-speed digital signal input to the high-speed side of the inverse multiplexer is output on the second terminal of the modems as a plurality of low-speed analog signals and vice versa.

DETAILED DESCRIPTION OF THE PREFERRED EMBODIMENT

Figure 1:
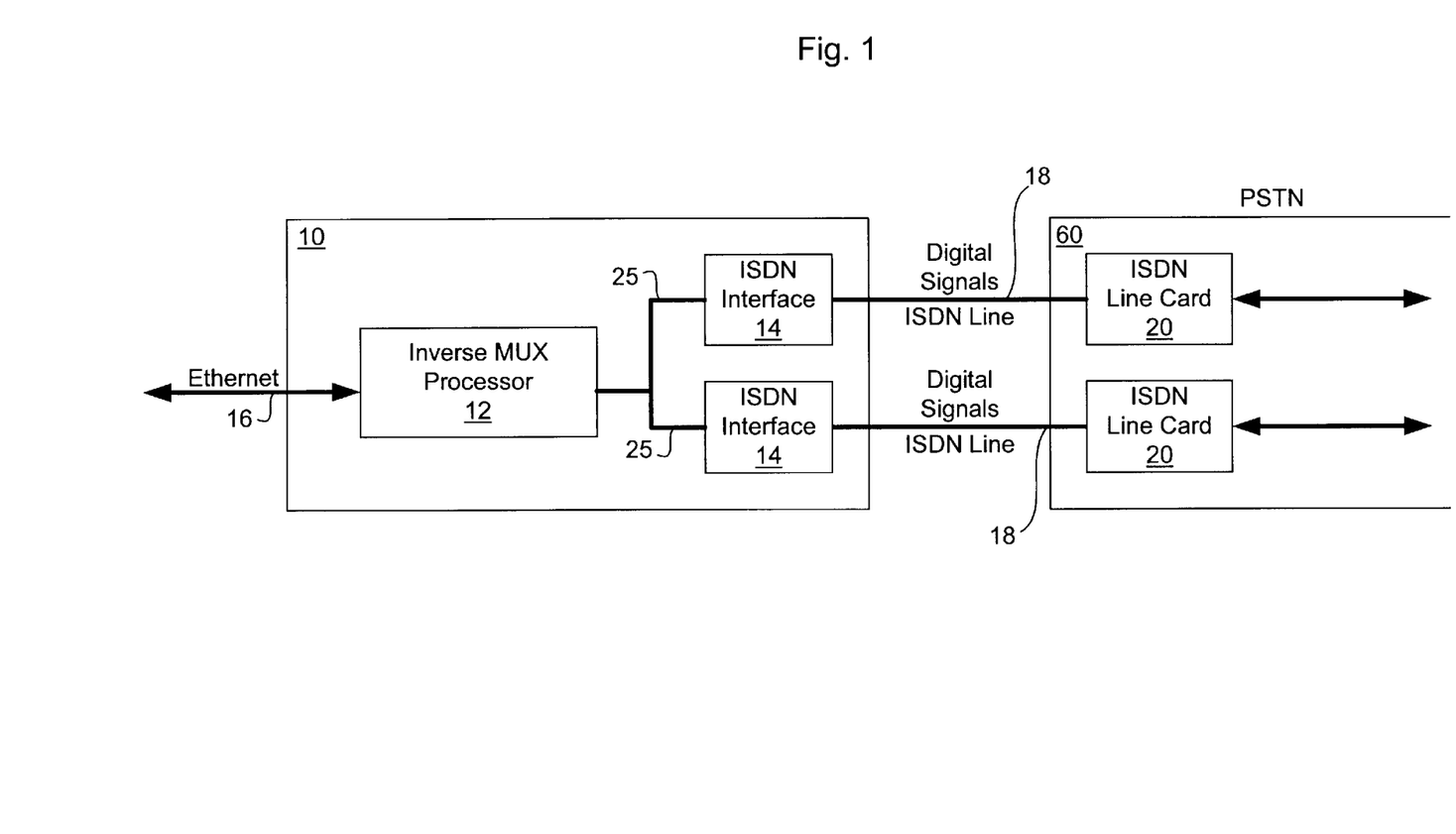
FIG. 1 is a block diagram of a prior art inverse multiplexer used to inverse multiplex two ISDN channels.

FIG. 1 shows a prior art inverse multiplexer 10 being used to inverse multiplex a high-speed digital signal 16. The prior art inverse multiplexer 10 shown in FIG. 1 is used in a data communication system that is digital end-to-end. Though FIG. 1 shows an end-to-end digital communication system based on ISDN, similar prior art systems are also used in association with other end-to-end digital communication systems such as Switched 56, Switched 64, Switched 384, Switched 1536. In this case, the inverse multiplexer microprocessor 12 receives a high-speed digital signal 16 and splits it into two low-speed digital signals 25 for transmission across two ISDN channels 18. An ISDN interface 14 is provided to interface between the inverse multiplexer 10 and the ISDN line cards 20 which are part of the public switched telephone network (PSTN) 60. The digital signals 25 transmitted on the two low-speed ISDN channels 18 are then transmitted over the PSTN 60 to the remote end (not 20 shown) where they are reverse inverse multiplexed into one high-speed digital signal. The ISDN channels 18 are typically sold to users at a premium over the cost of a Plain Old Telephone System (POTS) line 28, 29 in FIG. 2 connected to the Public Switched Telephone Network. While only two low-speed digital signals 25 are shown in FIG. 1, prior art inverse multiplexers have the capability to split a high-speed digital signal 16 into any number of low-speed digital signals. The high-speed digital signal 16 shown in FIGS. 1, 2, 3, 4, 5A and 5B may be carried across a number of transmission lines, including an Ethernet line.

Figure 2:
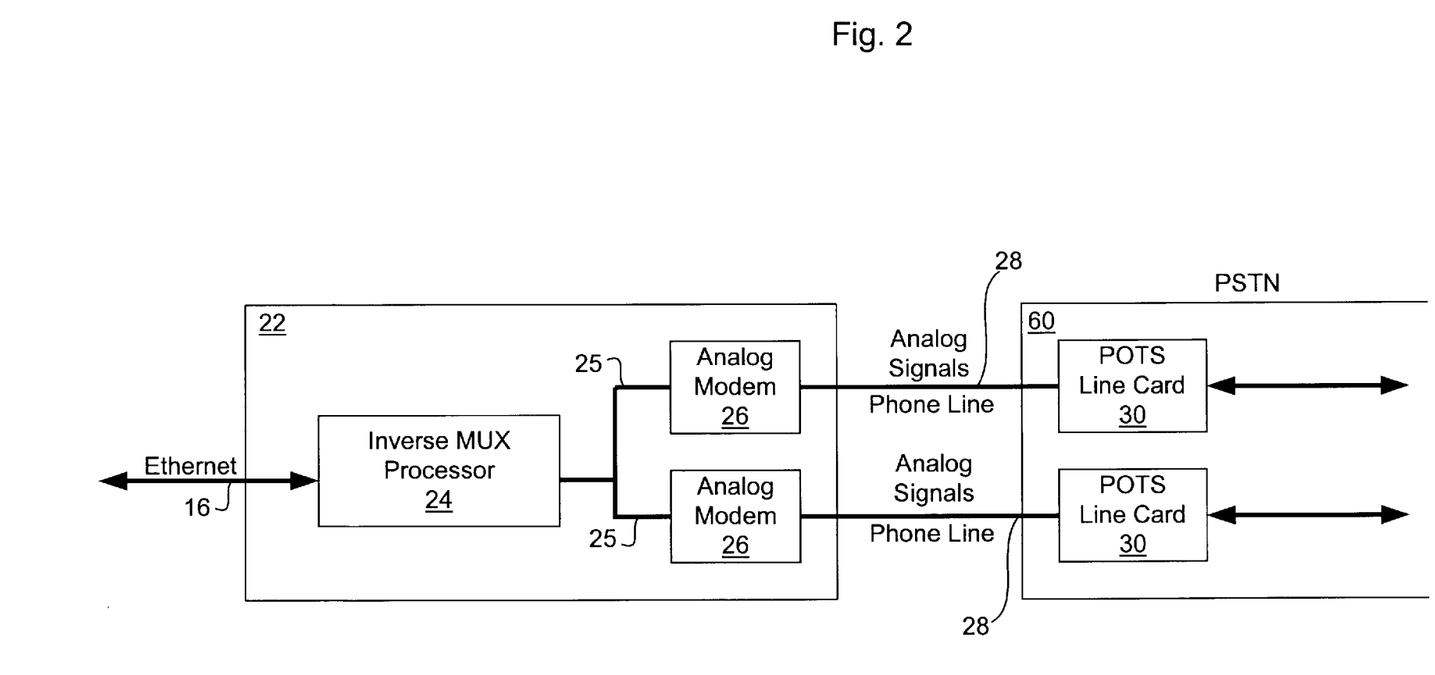
FIG. 2 is a block diagram of the inverse multiplexer of the present invention used to inverse multiplex two analog channels.

FIG. 2 shows an inverse multiplexer 22 of the present invention. Rather than being used in a data communication system that is digital end-to-end, the inverse multiplexer 22 of the present invention is designed to inverse multiplex a high-speed digital signal 16 into a plurality of analog signals for transmission across analog channels 28, 29 to the PSTN 60. The analog channels 28, 29 would most commonly be comprised of regular POTS telephone lines of the type used to transmit voice traffic from the user's premises to the PSTN 60. As a result, there is no premium associated with the use of these analog channels 28, 29 as compared to the cost of a digital access line such as ISDN. The user need only pay for the use of the n POTS lines from its premises to the PSTN 60, where n is the number of analog channels 28, 29 required to meet the bandwidth requirements of the high-speed digital signal 16 to be inverse multiplexed in accordance with the present invention.

In operation, a high-speed digital signal 16 is input to an inverse multiplexer microprocessor 24, which is responsible for setting up analog channels 28, 29 as required, providing end-to-end ordering, delay compensation, and synchronization with the remote end (not shown). This functionality is provided by software executing standardized communications protocols on the inverse multiplexer microprocessor 24. The inverse multiplexer microprocessor 24 splits the high-speed digital signal 16 into two low-speed digital signals 25 that are input to two analog modems 26. The analog modems 26 modulate the low-speed digital signals into two low-speed analog signals for transmission over the analog channels 28, 29 to POTS line cards 30 which are part of the PSTN 60. The operation of the present invention is not dependent on the manner in which the analog signals are transmitted across the PSTN 60 to the remote end. Data carried by channels 28, 29 are transmitted across the PSTN 60 in accordance with whatever transmission and switching means is employed by the PSTN 60, either digital, analog, or some combination thereof. At the remote end, the data carried by channels 28, 29 is reverse inverse multiplexed by an inverse multiplexer identical to inverse multiplexer 22 but operating in a reverse inverse multiplexing mode.

The present invention is bi-directional, in that it is also utilized to receive data from the remote end on a plurality of low-speed analog channels 28, 29 to be reverse inverse multiplexed into one high-speed digital signal 16. Although only two analog channels 28, 29 are shown in FIG. 2, the present invention can be used to inverse multiplex a high-speed digital signal into any number of analog signals carried by analog channels 28, 29. The number of analog channels 28, 29 required is dependent on the data rate of the high-speed digital signal 16 to be inverse multiplexed, and the speed of the analog modems 26. For each additional analog channel to be accommodated, there would be required one additional analog modem 26.

There is no upper or lower limit on the speed of the analog modems used in accordance with the present invention. In the preferred embodiment, a plurality of 56 kbit/s analog modems 26 are connected to the inverse multiprocessor 24. This permits the rate of the high-speed digital signal 16 to operate at a speed of up to n×56 kbit/s, where n is the number of 56 kbit/s analog modems used. Persons skilled in the art will appreciate that present day 56 kbit/s analog modems 26 are asymmetric, which means that where the remote end has a direct digital connection to the PSTN 60, 56 kbit/s analog modems can receive data at a rate of up to 56 kbit/s, though can only transmit data at a rate of up to 33.6 kbit/s, and vice versa. The 56 kbit/s analog modems that operate in accordance with the present invention are compatible with both the K56Plus™ standard developed by Rockwell International™, and the X2™ standard developed by U.S. Robotics™.

Analog modems 26 that can transmit and receive data at lower speeds, such as 33.6 kbit/s, may also be used in accordance with the present invention. For example, if three 56 kbit/s analog modems 26 were employed by the inverse multiplexer 22, the maximum data rate of the aggregated channel would be 3×56 kbit/s, or 168 kbit/s. The present invention will function with analog modems 26 operating at any data rate, not only with modems operating at data rates of 56 kbit/s, or 33.6 kbit/s.

Figure 3:
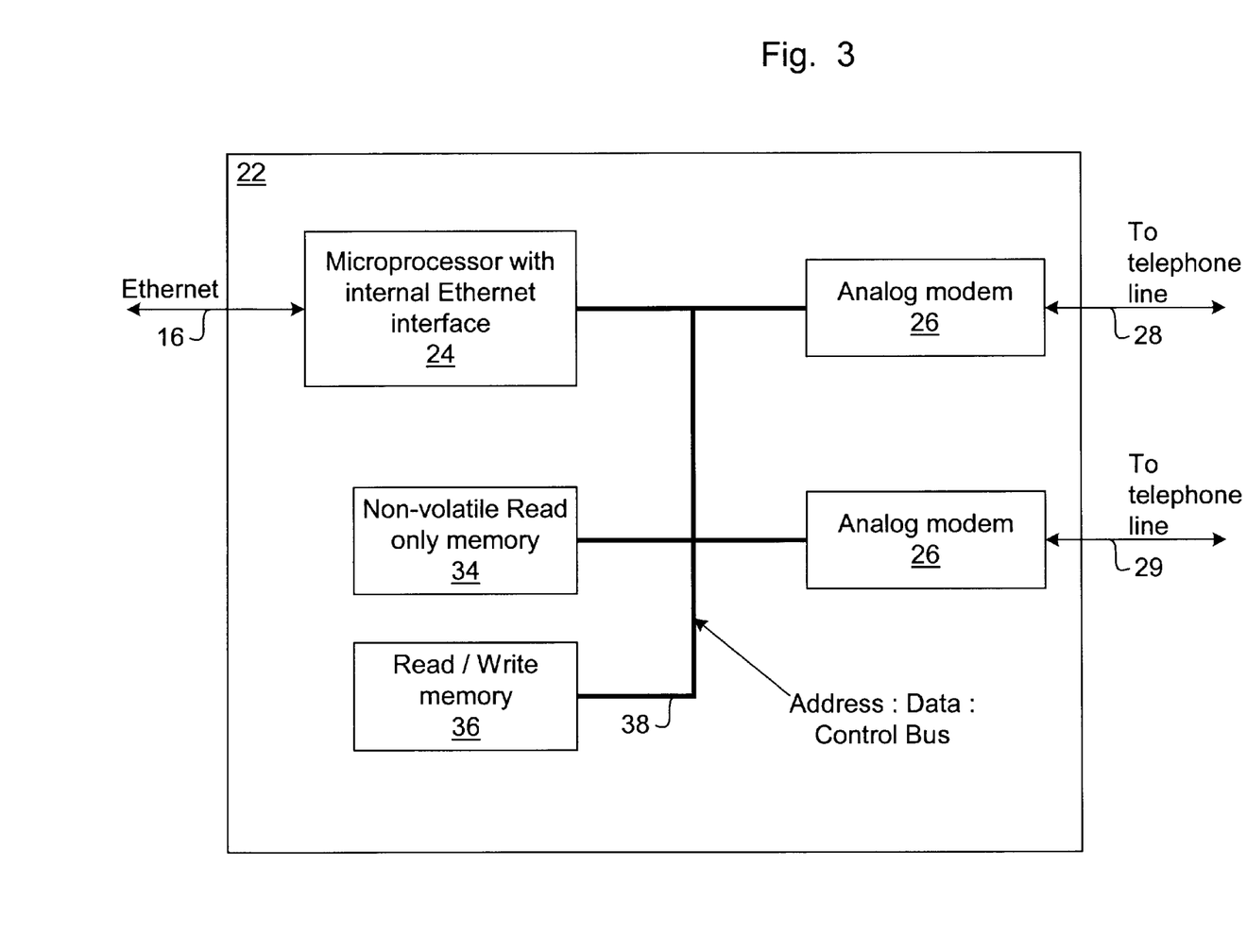
FIG. 3 is a detailed block diagram of the inverse multiplexer of the present invention.

FIG. 3 is a detailed block diagram of the inverse multiplexer 22 of the preferred embodiment of the present invention. Within the inverse multiplexer 22 is a microprocessor 24 with integral Ethernet hardware interface (not shown), a block of non-volatile read-only memory (ROM) 34, a block of read/writable memory (RAM) 36 and at least two analog modem chips 26. Though only two analog modem chips 26 are shown, the inverse multiplexer 22 of the present invention can accommodate up to n analog modem chips 26, where n is the number of analog channels 28, 29 required to meet the bandwidth requirements of the high-speed digital signal 16. Connecting these devices together is a (address:data:control) bus 38 which moves data and control information to and from the analog modem chips 26. Not shown, but which may be present, are minor support logic, such as a reset circuit, clock oscillator and block selection logic.

Stored within the ROM memory 34 is software for performing standardized inverse multiplexing protocol and other functions. The RAM 36 is used for data buffering and other data store.

In the preferred embodiment, inverse multiplexing is performed using the PPP Multilink Protocol (MP). This protocol is capable of splitting, recombining, and sequencing the transmission and reception of data on multiple channels. The purpose of the PPP Multilink Protocol is to establish the channels to be used for the connection between the user's premises and the remote end, determine how the receiving inverse multiplexer (not shown) will reorder the incoming data from the individual channels, and how it will compensate for the relative delays between channels. The PPP Multilink Protocol is described in Internet Engineering Task Force (IETF) Request for Comments (RFC) 1990. A standardized protocol is used to assure interoperability with the equipment on the remote end of the transmission. By using standard inverse multiplexing protocols, a user may send and receive data from equipment located at the remote end that may be manufactured by a vendor different from the vendor who manufactured the user's inverse multiplexing equipment.

In addition to software running standardized inverse multiplexing protocol, there may be specialized software resident in the ROM 34 designed to provide an interface between the inverse multiplexer microprocessor 24 and the analog modem chips 26, to turn the system on and off, setup the system, initiate dialing, etc.

Figure 4:
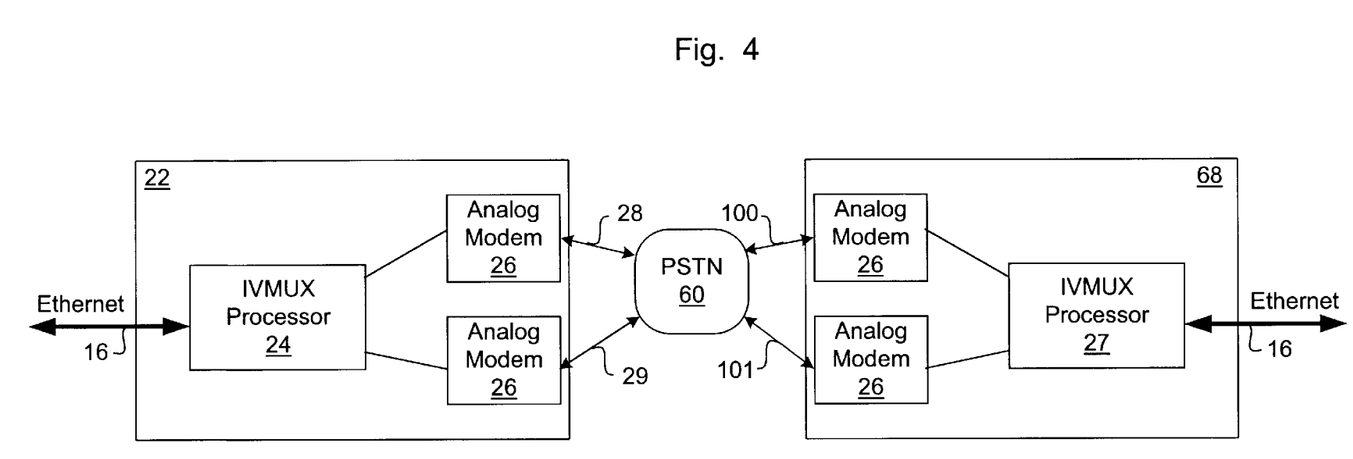
FIG. 4 is a block diagram of the inverse multiplexer of the present invention used to inverse multiplex two analog channels to a remote end having an analog connection to the public switched telephone network.

FIG. 4 illustrates the inverse multiplexer of the present invention used to inverse multiplex a high-speed digital signal 16 into a plurality of analog signals for transmission across analog channels 28, 29 to a remote end 68 having analog connection 100, 101 to the PSTN 60. The detail included in FIG. 2 relating to the POTS line card 30 is excluded from FIG. 4 for the purposes of clarity. In the embodiment of the invention illustrated in FIG. 4, the remote end 68 includes a configuration of devices 26, 27 that is the mirror image of the configuration of devices 24, 26 located at the user's premises.

To operate the inverse multiplexer 22 shown in FIG. 4, the user would place a telephone call over analog channel 28 across the PSTN 60, over analog channel 100, to the receiving inverse multiplexer microprocessor 27. To ensure interoperability, the receiving inverse multiplexer microprocessor 27 must be set-up to transmit and receive data using the same protocol as that employed by the calling inverse multiplexer microprocessor 24 located at the user's premises. When channel 28, 60, 100 is established, and the receiving inverse multiplexer 27 confirms that it is capable of supporting multilink connections, the initiating multiplexer microprocessor 24 requests addition of another link to the connection. When the receiving multiplexer processor 27 agrees to the establishment of another link 29, 60, 101, the initiating multiplexer processor 24 will establish a connection on the second link. After the appropriate network layer protocol has been negotiated between the multiplexer processors 24, 27 and the second link has been established, the data traffic may be exchanged over the multilink connection.

In accordance with the inverse multiplexing protocol employed by the inverse multiplexer microprocessor 24, the high-speed digital signal 16 is split into two low-speed digital signals and framed for transmission across analog channels 28, 29, across the PSTN 60, through analog channels 100, 101, to the remote end 68. The signals on the analog channels 28, 29 are transmitted across the PSTN 60 in accordance with whatever transmission and switching means is employed by the PSTN 60, either digital, analog, or some combination thereof. If the PSTN 60 is a digital network, equipment located at the end of the PSTN 60 nearest to the calling inverse multiplexer microprocessor 24 must perform an analog-to-digital conversion of the signals carried by the analog channels 28, 29 for transmission and switching across the PSTN 60. As well, equipment located at the end of the PSTN 60 nearest to the receiving inverse multiplexer microprocessor 27 must perform a digital-to-analog conversion to reconstitute the signals carried by analog channels 28, 29 into their remote end counterparts 100, 101.

Signals transmitted over analog channels 100, 101 are received by the analog modems 26 located at the remote end, and demodulated for transmission to the receiving inverse multiplexer microprocessor 27. In accordance with the PPP Multilink Protocol, the receiving inverse multiplexer microprocessor 27 re-aggregates or reverse inverse multiplexers the data into a high-speed digital signal compensating for any relative delays between channels. The receiving inverse multiplexer microprocessor 27 will insert framing data into the high-speed digital signal 16 in accordance with whatever transmission line is used at the remote end. For example, Ethernet framing data will be inserted into the high-speed digital signal 16 if an Ethernet line is used to transmit the high-speed digital signal 16. Once the communication is terminated, the calling inverse multiplexer microprocessor 24 performs the necessary signalling functions to remove channels 28, 29, 100, 101. The system illustrated in FIG. 4 is bi-directional, such that the inverse multiplexer microprocessors 24, 27 can operate as both a calling inverse multiplexer microprocessor, and a receiving inverse multiplexer microprocessor.

Figure 5A:
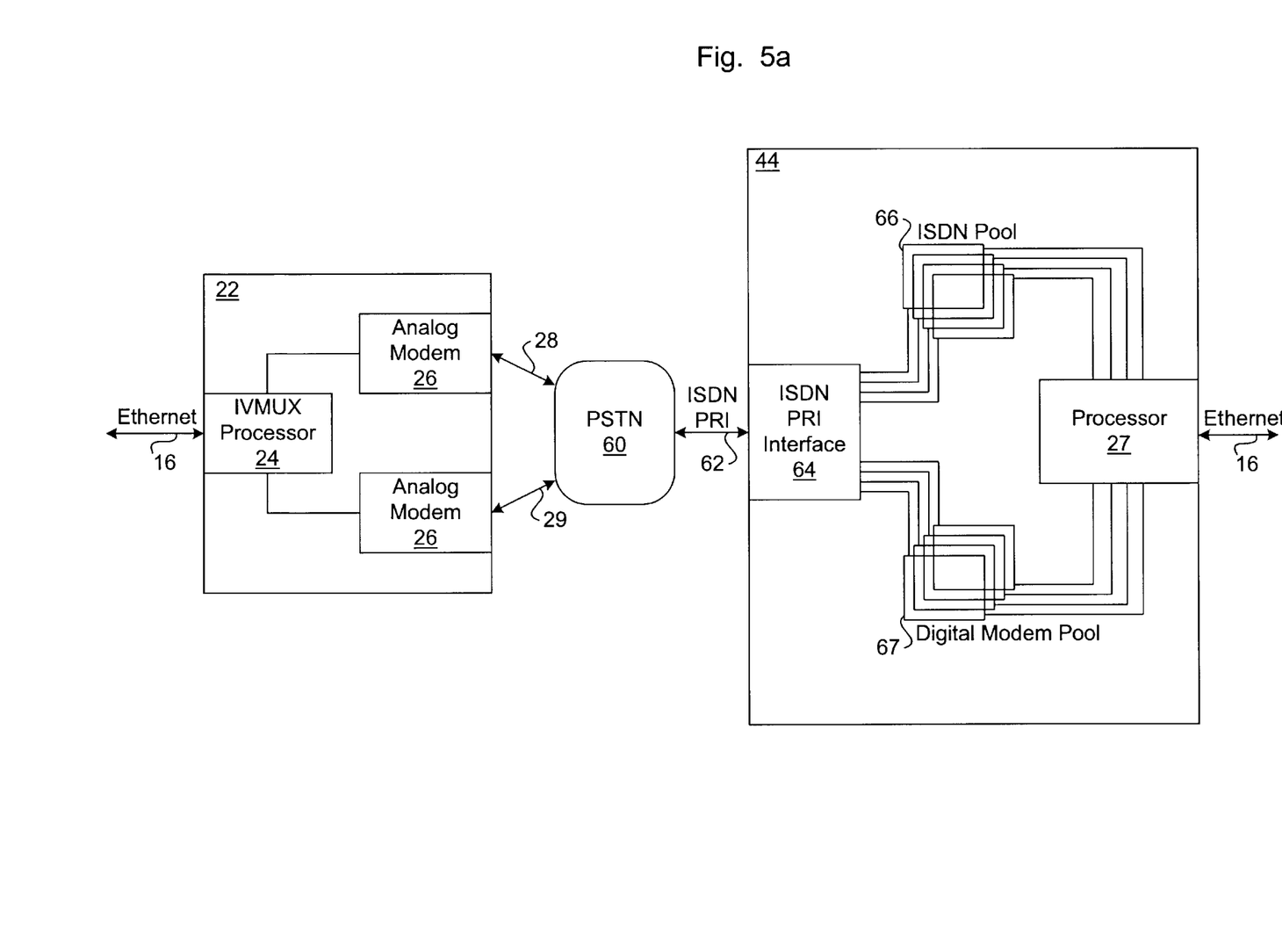
FIG. 5A is a block diagram of the inverse multiplexer of the present invention used to inverse multiplex two analog channels to an Internet Service Provider at the remote end having an ISDN PRI connection to the public switched telephone network.
Figure 5B:
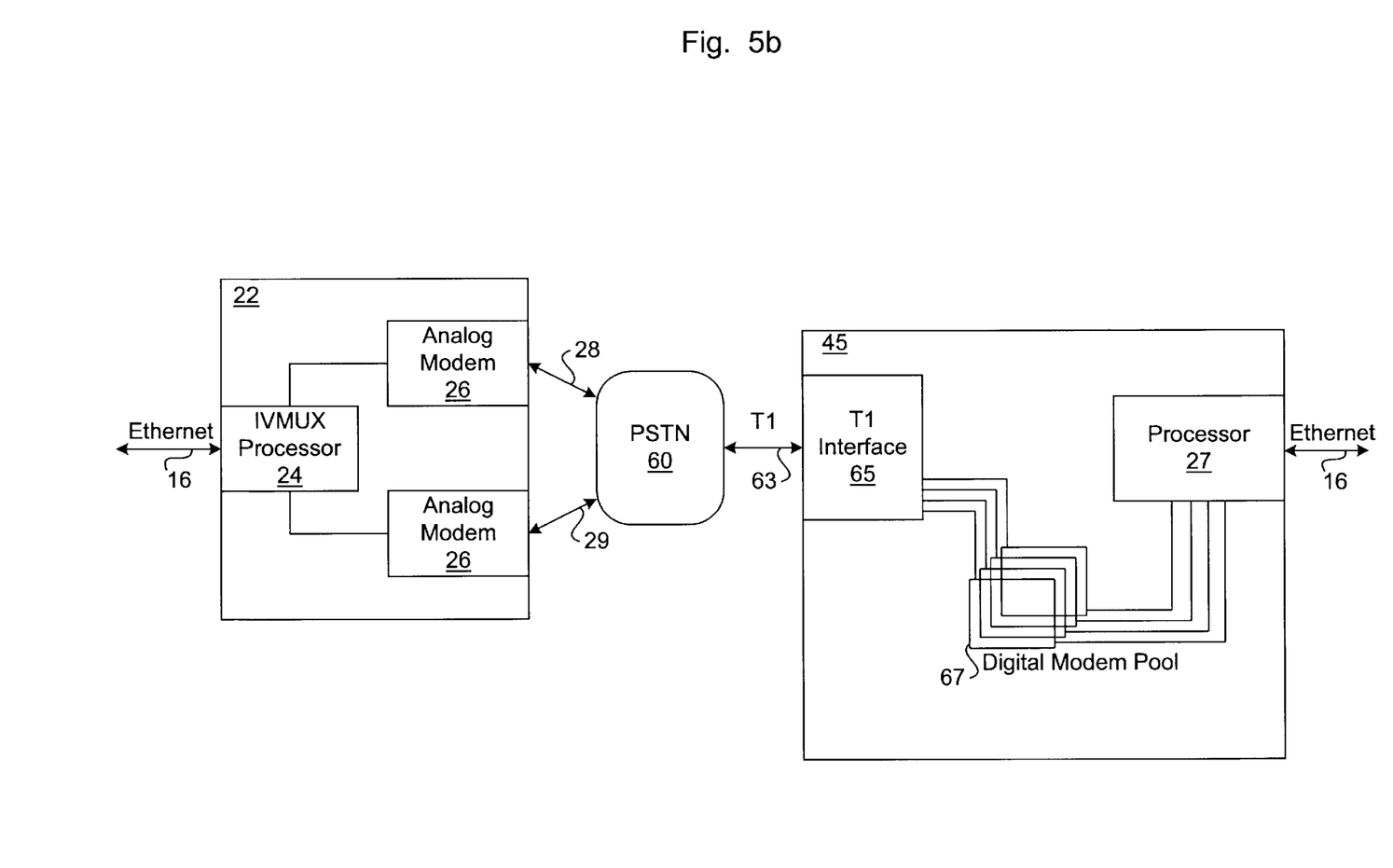
FIG. 5B is a block diagram of the inverse multiplexer of the present invention used to inverse multiplex two analog channels to an Internet Service Provider at the remote end having a T1 connection to the public switched telephone network.

In the embodiment illustrated in FIG. 4, the maximum data rate for each analog modem 26 is 33.6 kbit/s. Data rates above 33.6 kbit/s (e.g. 56 kbit/s) can only be achieved where the remote end has a direct digital connection to the PSTN 60 (as illustrated in FIGS. 5A and 5B). Where the remote end does not have a direct digital connection to the PSTN (as illustrated in FIG. 4), quantization noise introduced by analog-to-digital converters that form part of the PSTN 60 impair transmission and reception such that the maximum data rate achievable by an analog modem 26 is only 33.6 kbit/s. This means that where two analog modems 26 are employed in the configuration illustrated in FIG. 4, the maximum achievable data rate would be 2×33.6 kbit/s, or 67.2 kbit/s. Due to their asymmetric nature, where the remote end has a direct digital connection to the PSTN 60 (as illustrated in FIGS. 5A and 5B), present day 56 kbit/s analog modems can receive data at a rate of up to 56 kbit/s, though can only transmit data at a rate of up to 33.6 kbit/s, and vice versa.

FIG. 5A illustrates the inverse multiplexer of the present invention used to inverse multiplex two analog channels 28, 29 to an Internet Service Provider (ISP) at the remote end 44 having an ISDN PRI 62 connection to the PSTN 60. In this case, the remote end 44 may be an ISDN access switch. The distinction between the embodiment of the present invention illustrated in FIG. 5A as compared to the embodiment illustrated in FIG. 4 is that the remote end 44 has a direct digital connection 62 to the PSTN 60. While an ISDN Primary Rate Interface (PRI) digital connection 62 is illustrated in FIG. 5A, the present invention can be used in association with any digital connection to the PSTN 60, such as a T1, as illustrated in FIG. 5B. In addition, it is to be understood that the processor 27 illustrated in FIGS. 5A and 5B is generally more powerful than the processor 27 illustrated in FIG. 4. This is because the processor 27 illustrated in FIGS. 5A and 5B must be designed to handle up to 24 channels, whereas the processor 27 illustrated in FIG. 4 may be required to handle only two channels, though it may be capable of handling up to n channels, where n is the number of analog channels 100, 101 required to meet the bandwidth requirements of the high-speed digital signal 16.

In the embodiment of the invention illustrated in FIG. 5A, the remote end 44 includes a configuration of components 67, 64, 66, 27 designed to deal with the direct digital connection 62 to the PSTN 60. In this case, analog signals carried by low-speed analog channels 28, 29 across the PSTN 60 are received by an ISDN PRI interface 64 which splits the ISDN PRI 62 line into 24 component 64 kbit/s digital channels. In the receive direction, the ISDN PRI interface 64 separates the ISDN PRI bit stream into 23 "B" channels, and one "ID" channel for subsequent processing by other components inside the switch located at the remote end 44. In the transmit direction, the ISDN PRI interface 64 combines signals to form 23 "B" channels, and one "D" channel, and transmits the combined signal onto the ISDN PRI line 62.

The individual 64 kbit/s digital channels will then be routed to either a pool of ISDN interfaces 66, or a pool of digital modems 67. Since the signals originating from the user's premises are not ISDN signals, the ISDN PRI interface 64 will route the 64 kbit/s channels containing the data originating with the user in quantized digital format to the pool of digital modems 67 connected to a receiving inverse multiplexer microprocessor 27. The digital modems 67 demodulate the signals transmitted from the ISDN PRI interface 64 into digital signals for use by the receiving inverse multiplexer microprocessor 27. When digital signals are received from the receiving inverse multiplexer microprocessor 27 (when, for example, user data is flowing from the remote end 44 to inverse multiplexer 22), the digital modems 67 will modulate the digital signals into waveforms in quantized digital format for use by the ISDN PRI interface 64.

Using the same standardized protocol employed by the calling inverse multiplexer microprocessor 24, the receiving inverse multiplexer microprocessor 27 reverse inverse multiplexes the data received from the digital modems 67 into a high-speed digital signal. The system illustrated in FIG. 5A is bi-directional, such that the inverse multiplexer microprocessors 24, 27 can operate as both a calling inverse multiplexer microprocessor, and a receiving inverse multiplexer microprocessor, even though the system typically operates in the receiving mode.

FIG. 5B illustrates the inverse multiplexer of the present invention used to inverse multiplex two analog channels 28, 29 to an ISP at the remote end 45 having a T1 connection to the PSTN 60. The distinction between the embodiment of the present invention illustrated in FIG. 5B as compared to the embodiment illustrated in FIG. 5A is that the remote end 45 has a T163 connection to the PSTN 60, rather than an ISDN PRI 62 connection. In the embodiment of the invention illustrated in FIG. 5B, the remote end 45 includes a configuration of components 65, 67, 27 designed to deal with the Ti connection 63 to the PSTN 60. In this case, analog signals carried by low-speed analog channels 28, 29 across the PSTN 60 are received by T1 interface 65 which splits the T1 line into 24 component 64 kbit/s digital channels which are routed to a pool of digital modems 67. Using the same standardized protocol employed by the calling inverse multiplexer microprocessor 24, the receiving inverse multiplexer microprocessor 27 reverse inverse multiplexes the data into a high-speed digital signal. As in FIGS. 4 and 5A, the system illustrated in FIG. 5A is bi-directional, such that the inverse multiplexer microprocessors 24, 27 can operate as both a calling inverse multiplexer microprocessor, and a receiving inverse multiplexer microprocessor, even though the system typically operates in the receiving mode.

Figure 6:
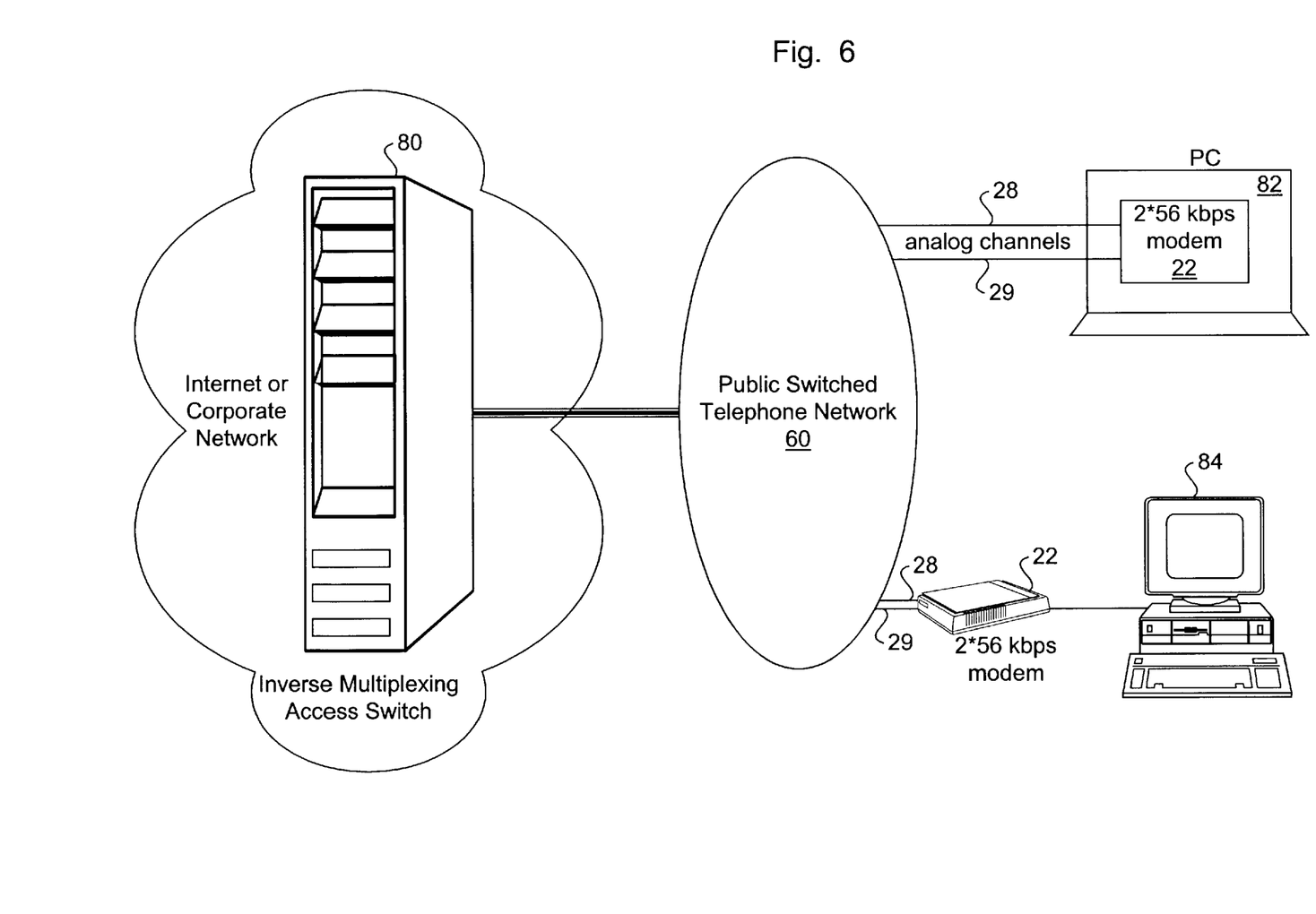
FIG. 6 is a block diagram showing the present invention being operated by a stand-alone personal computer.

FIG. 6 illustrates the present invention being operated by a stand-alone personal computer 82, 84. With respect to personal computer 82, the inverse multiplexer 22 is located internally, whereas with respect to personal computer 84, the inverse multiplexer 22 is located externally. The configuration of the communications equipment illustrated in FIG. 6 is applicable to a single user who is using the present invention to transmit and receive data to/from the Internet, or a private network through an access switch 80. The access switch 80 may be configured in a number of ways, including the configurations 44, 45 illustrated in FIGS. 5A and 5B. By combining the data rates of the analog channels 28, 29 connected to the user's premises, the user may transmit and receive data from the Internet and/or private network at high-speeds, without the need for a specialized digital access line. Instead, a user need only purchase access to the required number of analog lines necessary to carry the user's data traffic. The cost of these additional analog lines is typically less than the cost of a specialized digital access line such as ISDN BRI.

Figure 7:
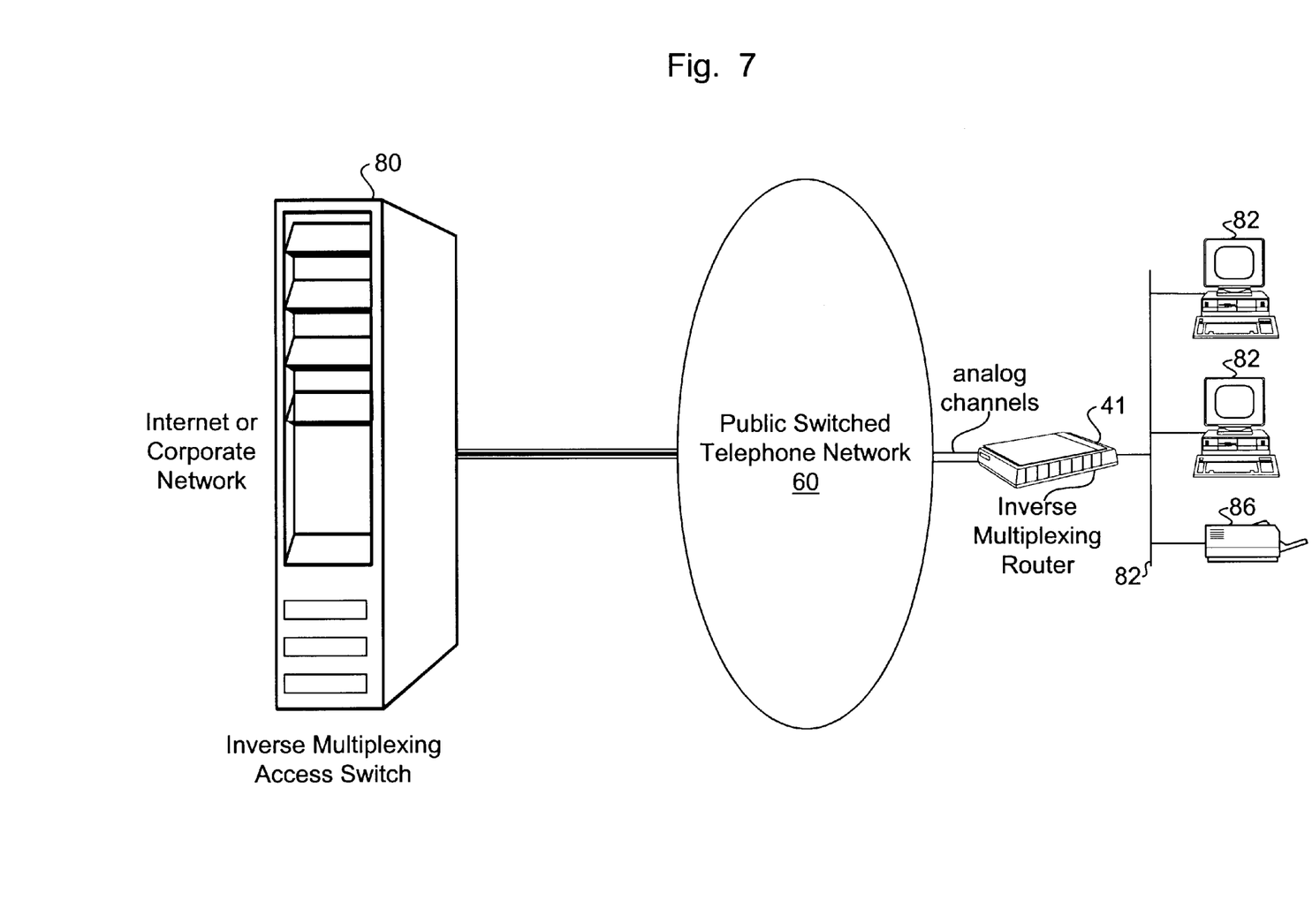
FIG. 7 is a block diagram showing the present invention being operated in a router arrangement; and, FIG. 8 is a block diagram showing the present invention being operated in a router and bridge arrangement.
Figure 8:
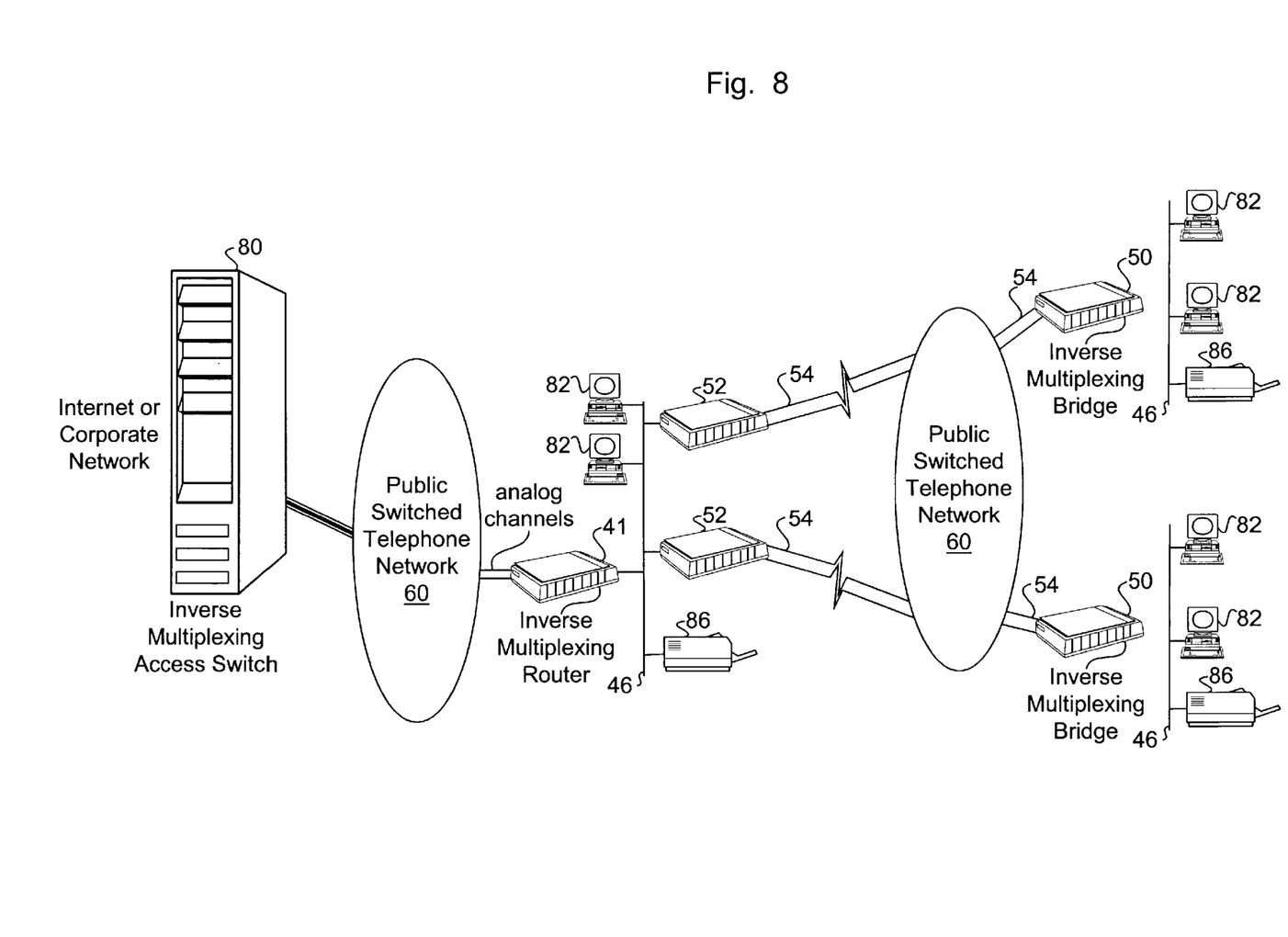

FIGS. 7 and 8 show different configurations for the devices supported by the present invention. In FIG. 7, the present invention is shown being operated in a router arrangement. In this configuration, the inverse multiplexer router 41 directs data packets to and from a variety of devices, such as personal computers 82 and a laser printer 86 via an Ethernet cable 46. The access switch 80 may be configured in a number of ways, including the configurations 44, 45 illustrated in FIGS. 5A and 5B. In this configuration, an inverse multiplexer router 41 is capable of transmitting and receiving data originating from, or destined to any of the devices 82, 86 connected to the Ethernet cable 46.

FIG. 8 is a block diagram showing the present invention being operated in a router and bridge arrangement. In the configuration, the inverse multiplexer bridge 50 is connected on one side via an Ethernet connection 46 to a plurality of devices, such as personal computers 82 and a laser printer 86. On the other side, the inverse multiplexer bridge 50 is connected via a plurality of analog channels 54 to its peer 52. The inverse multiplexer bridges 50, 52 are used to pass data traffic between segments of the network at high-speeds using only analog channels 54. In the configuration shown in FIG. 8, the inverse multiplexer bridges 52 are themselves connected to each other and to a variety of devices, such as personal computers 82, a laser printer 86, and an inverse multiplexer router 41 via an Ethernet cable 46. In this configuration, the inverse multiplexer router 41 is capable of transmitting and receiving data originating from, or destined to any of the devices 82, 86 connected to the Ethernet cable 46, or the inverse multiplexer bridges 50, 52, or the access switch 80.

What is claimed is:

1. A data communication device comprising an inverse multiplexer processor having a high-speed side and a low-speed side, memory coupled to said inverse multiplexer processor storing multilink protocol software, a plurality of analog modems each having a first terminal connected in common to the low-speed side of the inverse multiplexer processor and each having a second terminal, whereby a high-speed Ethernet signal input to the high-speed side of the inverse multiplexer processor is acted upon by the inverse multiplexer processor executing the multilink protocol software to split said high-speed Ethernet signal into a plurality of aggregated low-speed Ethernet frames each containing multilink protocol sequence data, the low-speed Ethernet frames being output on the second terminal of the analog modems as a plurality of aggregated low-speed analog signals.

2. The data communication device of claim 1 wherein the analog modems are connected to respective analog lines connected to the public switched telephone network.

3. The data communication device of claim 1 wherein the inverse multiplexer processor includes means for establishing a connection with the internet or other computer network.

4. The data communication device of claim 1 further including a router connected to the high-speed side of the inverse multiplexer processor for routing said high-speed Ethernet signal from one or more computing devices.

5. A data communication device comprising a reverse inverse multiplexer processor having a high-speed side and a low-speed side, memory coupled to said reverse inverse multiplexer processor storing multilink protocol software, a plurality of analog modems each having a first terminal connected in common to the low-speed side of the reverse inverse multiplexer processor and each having a second terminal, whereby a plurality of aggregated low-speed analog signals input to the second terminal of said analog modems is output at said first terminal of said analog modems as a plurality of aggregated low-speed Ethernet frames each containing multilink protocol sequence data, the reverse inverse multiplexer processor executing the multilink protocol software and acting upon the aggregated low-speed Ethernet frames to compensate for any transmission delays and recombining said low-speed Ethernet frames into a single high-speed Ethernet signal.

6. The data communication device of claim 5 wherein the analog modems are connected to respective analog lines connected to the public switched telephone network.

7. The data communication device of claim 5 wherein the reverse inverse multiplexer processor includes means for establishing a connection with the internet or other computer network.

8. The data communication device of claim 5 further including a router connected to the high-speed side of the reverse inverse multiplexer processor for routing said single high-speed Ethernet signal from one or more computing devices.

9. A data communication device comprising a transmission end and a receiving end, the transmission end including an inverse multiplexer processor having a high-speed side and a low-speed side, memory coupled to said inverse multiplexer processor storing multilink protocol software, a plurality of transmission end analog modems each having a first terminal connected in common to the low-speed side of the inverse multiplexer processor and each having a second terminal, whereby a high-speed Ethernet signal input to the high-speed side of the inverse multiplexer processor is acted upon by the inverse multiplexer processor executing the multilink protocol software to split said high-speed Ethernet signal into a plurality of aggregated low-speed Ethernet frames each containing multilink protocol sequence data, the low-speed Ethernet frames being output on the second terminal of said transmission end analog modems as a plurality of aggregated low-speed analog signals;

the receiving end including a reverse inverse multiplexer processor having a high-speed side and a low-speed side, memory coupled to said reverse inverse multiplexer processor storing multilink protocol software, a plurality of receiving end analog modems each having a first terminal connected in common to the low-speed side of the reverse inverse multiplexer processor and each having a second terminal, whereby when said plurality of aggregated low-speed analog signals are input to the second terminal of said receiving end analog modems said aggregated low-speed analog signals are output at said first terminal of said receiving end analog modems as a plurality of aggregated low-speed Ethernet frames each containing multilink protocol sequence data, the reverse inverse multiplexer processor executing the multilink protocol software and acting upon the aggregated low-speed Ethernet frames to compensate for any transmission delays and recombining said low-speed Ethernet frames into a single high-speed Ethernet signal.

10. The data communication device of claim 9 wherein the transmission end analog modems and the receiving end analog modems are connected to respective analog lines connected to the public switched telephone network.

11. The data communication device of claim 9 wherein the inverse multiplexer processor includes means for establishing a connection with the internet or other computer network.

12. The data communication device of claim 9 wherein the reverse inverse multiplexer processor includes means for establishing a connection with the internet or other computer network.

13. The data communication device of claim 9 wherein said transmission end further includes a router connected to the high-speed side of the inverse multiplexer processor for routing said high-speed Ethernet signal from one or more computing devices.

14. The data communication device of claim 9 wherein said receiving end connected to the high-speed side of the reverse inverse multiplexer processor further includes a router for routing said high-speed Ethernet signal to one or more computing devices.

15. A data communication device comprising a transmission end and a receiving end, the transmission end including an inverse multiplexer processor having a high-speed side and a low-speed side, memory coupled to said inverse multiplexer processor storing multilink protocol software, a plurality of transmission end analog modems each having a first terminal connected in common to the low-speed side of the inverse multiplexer processor and each having a second terminal, whereby a high-speed Ethernet signal input to the high-speed side of the inverse multiplexer processor is acted upon by the inverse multiplexer processor executing the multilink protocol software to split said high-speed Ethernet signal into a plurality of aggregated low-speed Ethernet frames each containing multilink protocol sequence data, the low-speed Ethernet frames being output on the second terminal of said transmission end modems as a plurality of aggregated low-speed analog signals;

said aggregated low-speed analog signals being converted to aggregated digital signals within the public switched telephone network;

the receiving end including a reverse inverse multiplexer processor having a high-speed side and a low-speed side, memory coupled to said reverse inverse multiplexer processor storing multilink protocol software, interface means for receiving said aggregated digital signals, a plurality of receiving end digital modems each having a first terminal connected in common to the low-speed side of the reverse inverse multiplexer processor and each having a second terminal connected to said interface means, whereby when said aggregated digital signals is input to the second terminal of said receiving end digital modems said aggregated digital signals are output at said first terminal of said receiving end digital modems as a plurality of aggregated low-speed Ethernet frames each containing multilink protocol sequence data, the reverse inverse multiplexer processor executing the multilink protocol software and acting upon the aggregated low-speed Ethernet frames to compensate for any transmission delays and recombining said low-speed Ethernet frames into a single high-speed Ethernet signal.

16. The data communication device of claim 15 wherein said interface means is an ISDN PRI interface.

17. The data communication device of claim 15 wherein said interface means is a T1 interface.

18. The data communication device of claim 15 wherein the transmission end analog modems are connected to respective analog lines connected to the public switched telephone network.

19. The data communication device of claim 15 wherein the inverse multiplexer processor includes means for establishing a connection with the internet or other computer network.

20. The data communication device of claim 15 wherein the reverse inverse multiplexer processor includes means for establishing a connection with the internet or other computer network.

21. The data communication device of claim 15 wherein said transmission end further includes a router connected to the high-speed side of the inverse multiplexer processor for routing said high-speed Ethernet signal from one or more computing devices.

22. The data communication device of claim 15 wherein said receiving end further includes a router connected to the high-speed side of the reverse inverse multiplexer processor for routing said high-speed Ethernet signal to one or more computing devices.

* * * * *